Aug. 19, 1969   MAKOTO TAKEUCHI ET AL   3,462,676
METHOD OF PRODUCING GYROMAGNETIC RESONANCE
Filed Nov. 29, 1966   2 Sheets-Sheet 1

INVENTOR.
Makoto Takeuchi
Kazuo Nakagawa
BY
Webb Burden Robinson & Webb

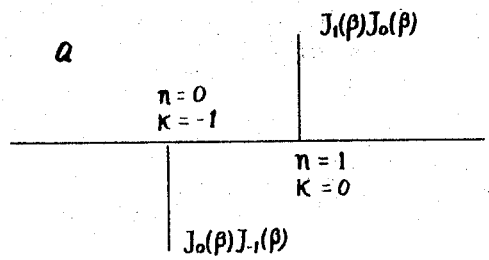
FIG.3
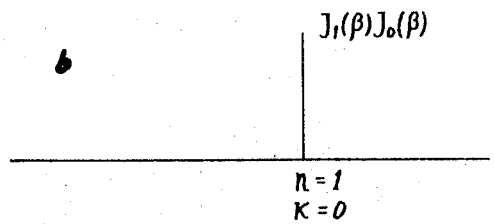
FIG.5
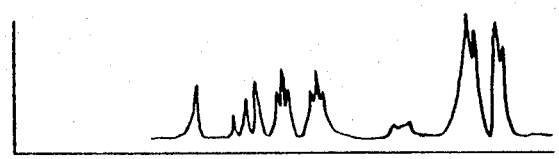
FIG.6
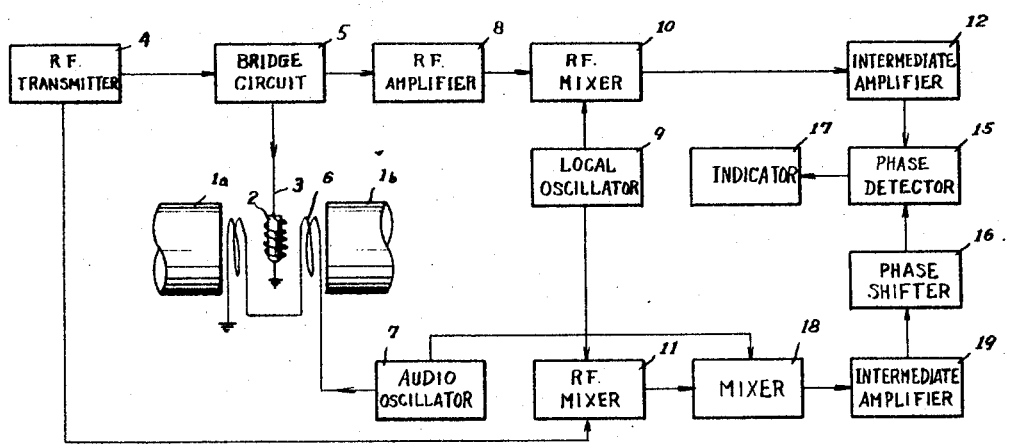

United States Patent Office 3,462,676
Patented Aug. 19, 1969

3,462,676
METHOD OF PRODUCING GYROMAGNETIC RESONANCE
Makoto Takeuchi and Kazuo Nakagawa, Tokyo, Japan, assignors to Nihon Denshi Kabushiki Kaisha, Tokyo, Japan, a corporation of Japan
Filed Nov. 29, 1966, Ser. No. 597,706
Claims priority, application Japan, Dec. 4, 1965, 40/74,546
Int. Cl. H03b 3/12
U.S. Cl. 324—.5          12 Claims

ABSTRACT OF THE DISCLOSURE

A method of producing gyromagnetic resonance in a sample by exposing the sample to an RF magnetic field normal to a polarizing magnetic field in which the sample is positioned. The latter field is modulated using an oscillator which superimposes an audio frequency field on the polarizing field. The modulation index is less than 1. By adjusting the polarizing field, the sample is made resonant with the RF field. A signal given off by the sample is detected, processed for direct comparison with a signal from the oscillator, and compared to determine sample resonance, thereby only the single side band resonance signal is desirably obtained.

---

This application relates to method for producing gyromagnetic resonance and more particularly to improved methods utilizing side band resonance techniques for producing and detecting gyromagnetic resonance of nuclei which exhibit large chemical shifts. The present invention is an improvement on a previous invention described in United States Patent No. 3,147,428, entitled, "Gyromagnetic Resonance Apparatus."

In the side band resonance technique, the motion of the nuclei having magnetic moment and spin and located in a polarizing magnetic field HI is given by Bloch's equation as follows:

$$\frac{d}{dt}M_x - \tau(M_yH_z - M_zH_y) + \frac{M_x}{T_2} = 0 \quad (1)$$

$$\frac{d}{dt}M_y - \tau(M_zH_x - M_xH_z) + \frac{M_y}{T_2} = 0 \quad (2)$$

$$\frac{d}{dt}M_z - \tau(M_xH_y - M_yH_x) + \frac{M_z - M_0}{T_1} = 0 \quad (3)$$

where $M_x$, $M_y$ and $M_z$ are the magnetization components in a mutually perpendicular direction, $H_x$ and $H_y$ are components of the rotating RF magnetic fields orientated in a plane perpendicular to the polarizing magnetic field $H_z$, $\tau$ is the gyromagnetic ratio, $M_0$ is the thermal equilibrium value in the Z-direction magnetization, $T_1$ is the spin-lattice relaxation time and $T_2$ is the spin-spin relaxation time.

Now, when the said polarizing magnetic field $H_z$ is modulated by an audio frequency magnetic field with a modulation amplitude $H_m$ and an angular frequency $\omega_m$, $H_z$ at a certain time $t$ is given by $$H_z = H_0 + H_m \cos(\omega_m t + \phi) \quad (4)$$

Now we define $m$, $h$ and $\omega^*$ as follows:

$$m = m_m e^{-j\omega_1 t} = M_x + jM_y \quad (5)$$

$$h = h_m e^{-j\omega_1 t} = \tau H_1 e^{-j\omega_1 t} = \tau(H_x + jH_y) \quad (6)$$

$$\omega^* = \tau H_z = \tau(H_0 + H_m) \cos(\omega_m t + \phi) \quad (7)$$

where:

$\omega_1$ = angular frequency of the radio frequency driving magnetic field, $m_m$ = the portion which varies slowly in $m$, $h_m$ = the value which is converted from the amplitude of the RF magnetic field $H_1$ to frequency units.

If we take Equations 1, 2 and 3, and substitute equations 5, 6 and 7, we obtain the two equations as follows:

$$\frac{dm}{dt} + j\omega^* m - jhM_z + \frac{m}{T_2} = 0 \quad (8)$$

$$\frac{dM_z}{dt} + Im(mh^*) + \frac{M_z - M_0}{T_1} = 0 \quad (9)$$

where $h^*$ denotes the complex conjugate of $h$ and $Im(mh^*)$ the imaginary part of $(mh^*)$.

The general solution of these equations are given as follows:

$$m_m = u + jv = j\tau H_1 M_0 T_2 \times \sum_{n=-\infty}^{\infty} \sum_{k=-\infty}^{\infty}$$

$$\frac{J_n(\beta)J_k(\beta)[1 - j(\Delta\omega + n\omega_m)T_2]\exp.[-j(k-n)\omega_m t]}{1 + (\Delta\omega - n\omega_m)^2 T_2^2 + \tau^2 H_1^2 J_n^2(\beta)T_1T_2}$$

(10)

where $J_n(\beta)$ are Bessel functions of the first kind, and $\Delta\omega = \omega_0 - \omega_1 = \tau H_0 - \omega_1$, $\beta$ is the modulation index and is indicated by $\tau H_m/\omega_m$. $m_m$ is the magnetization in the rotating coordinate whose angular frequency is $\omega_0$. The frequency spectrum of a side band signal of a suitable number in the said general solution, is given by the summation of index $k$.

Thus:

$$m = m_m e^{-j\omega_1 t} = j\tau H_1 M_0 T_2 \times$$

$$\frac{J_n(\beta)[1 - j(\Delta\omega + n\omega_m)T_2]}{1 + (\Delta\omega + n\omega_m)^2 T_2^2 + \tau^2 H_1^2 J_n^2(\beta)T_1T_2} \times \{\ldots$$

$$+ J_{n-2}(\beta)e^{-j(\omega_1 - 2\omega_m)t} + J_{n-1}(\beta)e^{-j(\omega_1 - \omega_m)t} + J_n(\beta)e^{-j\omega_1 t}$$

$$+ J_{n-1}(\beta)e^{-j(\omega_1 + \omega_m)t} + J_{n-2}(\beta)e^{-j(\omega_1 + 2\omega_m)t} + \ldots\}$$

(11)

The polarizing magnetic field $H_0$ and frequency $\omega_1$ at which maximum resonance occurs are selected so that the denominators of Formulae 10 and 11 exhibit minimum values, i.e., when $\Delta\omega + n\omega_m = 0$ or $\omega_1 = \omega_0 + n\omega_m$ where $n = 0, \pm 1, \pm 2, \pm 3 \ldots$ The first, second and third side band, etc., correspond to the $n$ numbers ($n = 1, 2, 3$, etc.) the frequencies at this instance being $$\omega_1 = \tau H_0, \quad \tau\left(H_0 \pm \frac{\omega_m}{\tau}\right), \quad \tau\left(H_0 \pm \frac{2\omega_m}{\tau}\right)$$

and so on respectively and the polarizing magnetic field corresponding to the above value is:

$$H_0 = \frac{1}{\tau}\omega_1, \frac{1}{\tau}(\omega_1 \mp \omega_m), \frac{1}{\tau}(\omega_1 \mp 2\omega_m)$$

and so on.

Each side band is separated by a frequency of $\omega_m$ or a magnetic field $\omega_m/\tau$. The side band signal for a given value of $n$ includes spectra with infinite frequency components which are indicated by the $k$ index in Formula 10. In other words, modulated frequency harmonics viz. $\omega_1$, $\omega_1 \pm \omega_m$, $\omega_1 \pm 2\omega_m$, $\omega_1 \pm 3\omega_m \ldots$ are included. In this case, the signal comprising the $\omega_m$ modulation frequency component is produced only when magnetic resonance occurs. If a lock-in detection system which detects only the above component is utilized, the D.C. fluctuation level due to the drift arising from the driving RF power does not appear in the resonance signal. Thus, spectra with stabilized base lines are obtained. As is well known, this is the principle of the base line stabilizer system which is in general use. This method is also used for measuring the chemical shift of a sample. For example, when the polarizing magnetic field $H_0$ is modulated by a magnetic field with a small amplitude audio frequency ($\omega_m$), side band signals separated by $\omega_m$ appear. Therefore, if $\omega_m$ is now accurately set, the precise chemical shift of signals which appear between the two side band signals for $n=0$ and $n=1$ is obtained by interpolation. However, when this conventional method is used as the base line stabilizer, this is limited in the case of chemical shifts smaller than the modulation frequency $\omega_m$. Therefore, when measuring samples with large chemical shifts (e.g., about 30 kc. at a 60 mc. driving magnetic field) such as with protons which are adjacent to paramagnetic metals and nuclei other than protons, the side band signals overlap, thus making signal analysis extremely difficult, if the usual modulation fequency (2 kc.~5 kc.) is used.

It is true that even under such circumstances, it may be theoretically possible to eliminate this phenomenon by applying a larger modulation frequency (e.g., 30 kc.) than the chemical shifts. Practically speaking, however, the use of such a large frequency presents certain problems in as much as that when increasing the modulation frequency, the amplitude of the modulating magnetic field $H_m$ needs to be increased in proportion to the frequency in order to maintain a constant modulation index $\beta$ ($\beta = \tau H_m / \omega_m$). Furthermore, since, except in the case of the hydrogen nucleus, the gyromagnetic ratio $\tau$ is comparatively small, it is necessary to apply a stronger modulation magnetic field in order to maintain a constant modulation index $\beta$. As a result, the $H_m$ power has to be increased, thus causing a direct flux leak from the modulation coil to the NMR detection coil. In practice this technique possesses many problems and difficulties from an economical and technological point of view.

Therefore, by utilizing our invention the above listed difficulties are appreciably overcome. In other words, it becomes possible to apply the usual modulation frequencies and amplitudes and at the same time to substantially eliminate signal overlapping.

The main features of our invention may be listed as follows: to enable the resonance signal of a sample having a nucleus of which the chemical shift is considerably large to be measured by keeping the signal base line stable, to provide an improved high resolution gyromagnetic resonance spectrometer and more particularly to enable the gyromagnetic resonances of nuclei such as $P^{31}$, $F^{19}$, $C^{13}$, and protons which are adjacent to paramagnetic metals, all of which show large chemical shifts, to be satisfactorily measured, to enable only one side band to be measured by setting the modulation index $\beta$ at less than 1, by choosing a driving RF magnetic field with a sufficiently large value so that only the first side band signal reaches the optimum condition and by setting the parameter of the filter system so as to pass only one frequency component. These and other features and advantages, will become apparent after perusing the following specification drawings where:

Figure 4:
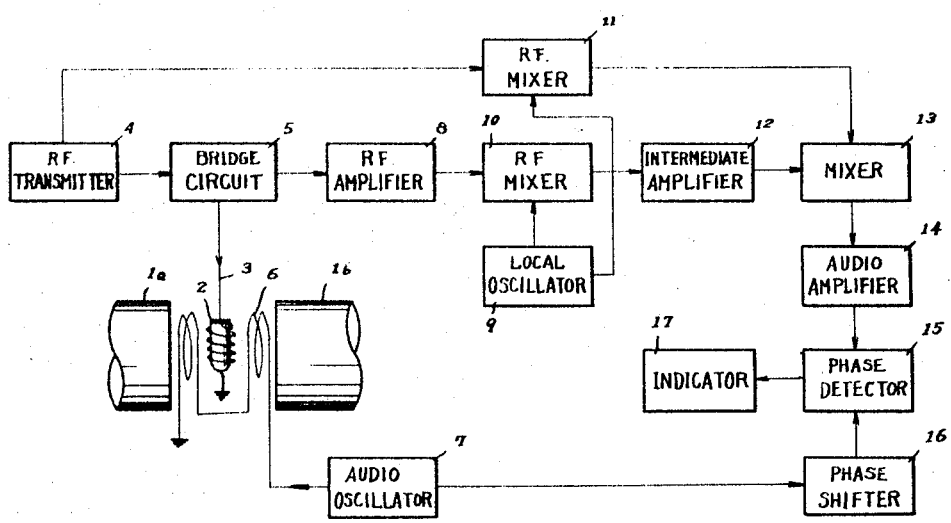

FIGURES 3(a) and (b) are graphical illustrations used for theoretically explaining the present invention;

FIGURE 4 is a block diagram showing the side band resonance gyromagnetic resonance spectrometer system as used in the present invention in which the audio frequency modulation of the polarizing magnetic field is utilized to produce a side band resonance signal; the system being of the single coil type;

FIGURE 5 shows the spectrum obtained by using the embodiment shown in FIGURE 4; and FIGURE 6 shows the block diagram of another type of gyromagnetic resonance spectrometer system designed in accordance with the present invention.

Figure 1:
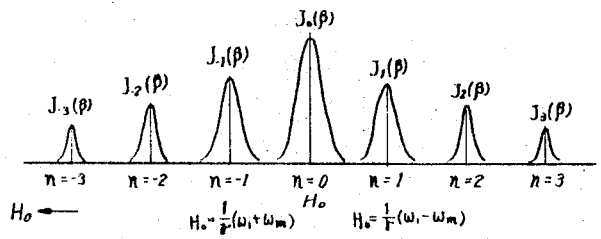
FIGURE 1 is a graphical illustration of the resonance signals obtained from a side band system.

Referring now to FIGURE 1, this shows graphically main band and side bands of the resonance signals. From Formula 11 the following relationships are given for the respective components of the side band signals having a frequency component of ($\omega_1 - \omega_m$) viz., $$n = -2, \quad K_{-2} J_{-2}(\beta) J_{-3}(\beta) e^{-j(\omega_1-\omega_m)t}$$

$$n = -1, \quad K_{-1} J_{-1}(\beta) J_{-2}(\beta) e^{-j(\omega_1-\omega_m)t}$$

$$n = 0, \quad K_0 J_0(\beta) J_{-1}(\beta) e^{-j(\omega_1-\omega_m)t}$$

$$n = 1, \quad K_1 J_1(\beta) J_0(\beta) e^{-j(\omega_1-\omega_m)t}$$

$$n = 2, \quad K_2 J_2(\beta) J_1(\beta) e^{-j(\omega_1-\omega_m)t}$$

$$n = 3, \quad K_3 J_3(\beta) J_2(\beta) e^{-j(\omega_1-\omega_m)t} \quad (12)$$

where $K_n$ is given by $$K_n = \frac{j\tau H_1 M_0 T_2 [1 - j(\Delta\omega + n\omega_m)T_2]}{1 + (\Delta\omega + n\omega_m)^2 T_2^2 + \tau^2 H_1^2 J_n(\beta) T_1 T_2} \quad (13)$$

Figure 2:
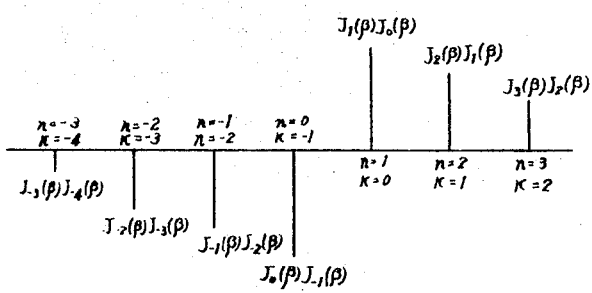
FIGURE 2 is a graphical illustration showing only one frequency component from each side band signal as shown in FIGURE 1.

The positions of the resonance signals as shown in FIGURE 1 are determined on the assumption that the denominator in Formula 13 is minimum. We find that the amplitudes of the respective side band signals having a frequency component ($\omega_1 - \omega_m$) are in proportion to the values of $J_n(\beta) J_{n-1}(\beta)$ shown in Formula 12. This is shown diagrammatically in FIGURE 2. In this figure, the polarities of the amplitudes are considered from the relationship $J_{-n}(\beta) = (-1)^n J_n(\beta)$ due to the nature of the Bessel function. The relative intensities of these signals as a function of modulation index $\beta$ are given as follows:

TABLE I

| $\beta$ | $J_1(\beta)J_0(\beta)$ | $J_2(\beta)J_1(\beta)$ | $J_3(\beta)J_2(\beta)$ |
|---|---|---|---|
| 1 | 0 | 0 | 0 |
| 0.02 | 0.0099 | 0.0000 | 0.0000 |
| 0.06 | 0.0298 | 0.0000 | 0.0000 |
| 0.10 | 0.0493 | 0.0000 | 0.0000 |
| 0.50 | 0.2274 | 0.0077 | 0.0007 |
| 1.00 | 0.3366 | 0.0506 | 0.0022 |
| 2.00 | 0.1289 | 0.2094 | 0.0454 |

It can be, therefore, easily deduced that the most optimum value which gives a maximum value of $J_1(\beta)J_0(\beta)$ in the region 1~2 does exist, and by means of accurate calculation, we can determine the maximum value when the modulation index $\beta$ is near 1.5. With the conventional apparatus, when using the base line stabilizer for detecting a conventional side band signal, $\beta = 1.8$ is normally used in the main band. On the other hand, the present invention uses a modulation index $\beta$ less than 1 in the first side band.

As apparent from the above table, $J_2(\beta)J_1(\beta)$ and $J_3(\beta)J_2(\beta)$ are less than $\frac{1}{1000}$ compared with $J_1(\beta)J_0(\beta)$ at, for example, $\beta = 0.02$. Therefore, when measuring resonance spectrum at $\beta = 0.02$, only two spectrum lines of the frequency component $\omega_1 - \omega_m$, at ($n=1$, $k=0$) and ($n=0$, $k=-1$) can actually be observed, and are shown in FIGURE 3(a). The signal amplitude of the harmonic components, for example $\omega_1 - 2\omega_m$, $\omega_1 - 3\omega_m$, etc., are represented by $J_n(\beta)J_{n-2}(\beta)$, $J_n(\beta)J_{n-3}(\beta)$, etc., which are shown in Formula 11. These signals can be neglected however, since they rapidly attenuate in excess of components $J_n(\beta)J_{n-1}(\beta)$. Moreover, the components having frequency $\omega_1$ and $\omega_1 + \omega_m$ are shown by $$J_0^2(\beta) \quad {}_{(n=0, k=0)}$$

$$J_1^2(\beta) \quad {}_{(n=1, k=1)}$$

and $$J_0(\beta) J_1(\beta) \quad {}_{(n=0, k=1)}$$

$$J_{-1}(\beta) J_0(\beta) \quad {}_{n=-1, k=0}$$

which may be neglected since the parameter of the filter system is so selected that only one frequency component $\omega_1 - \omega_m$ is detected. Thus, we further analyze in detail the two components of ($n=1$, $k=0$) and ($n=0$, $k=1$) which are shown in FIGURE 3(a). Since these two signals have mutually opposing polarities, spectrum analysis can be carried out by selecting one polarity only. However, when one of the signals in the spectrum to be observed and the other signal of opposite polarity spectrum in the adjacent side band overlap, only the difference of the two spectra is observed. In such cases it is difficult to identify the respective signals, therefore, a method must be devised whereby the signal represented by one side of the spectrum is removed. Now as is shown in FIGURE 3(a), the signals of ($n=1$, $k=0$) and ($n=0$, $k=-1$) appear the same, but their polarities are different. However, when considering the nuclear magnetic resonance saturation phenomenon, the magnetic resonance absorption condition changes.

The general equation of the frequency spectrum for $\omega_1 - \omega_m$ is determined by Formulae 12 and 13, and the real part in this equation is given as $$Re(m) = \frac{\tau H_1 M_0 T_2 J_n(\beta) J_{n-1}(\beta)[(\Delta\omega + \eta\omega_m) T_2 \cos(\omega_1 - \omega_m)t + \sin(\omega_1 - \omega_m)t]}{1 + (\Delta\omega + \eta\omega_m)^2 T_2^2 + \tau^2 H_1^2 J_n(\beta) T_1 T_2} \quad (14)$$

Now instead of the rotating field, the single oscillating magnetic field in the direction along the X-axis is given as $$H_x = 2H_1 \cos \omega_1 t$$
$$H_y = 0 \quad (15)$$

If we let the in phase component and the out of phase component of sample magnetic susceptibility $\chi$ be represented by $\chi'$ and $\chi''$ respectively, the magnetization is denoted as follows:

$$m = \chi' 2H_1 \cos \omega_1 t + \chi'' 2H_1 \sin \omega_1 t \quad (16)$$

By comparing Formulae 14 with 16 under $\omega_1 \gg \omega_m$, $\chi'$ and $\chi''$ may be expressed as follows:

$$\chi' = \frac{\tau M_0 T_2^2 J_n(\beta) J_{n-1}(\beta)(\Delta\omega + \eta\omega_m)}{2[1+(\Delta\omega+\eta\omega_m)^2 T_2^2 + \tau^2 H_1^2 J_n^2(\beta) T_1 T_2]} \quad (17)$$

$$\chi'' = \frac{\tau M_0 T_2 J_n(\beta) J_{n-1}(\beta)}{2[1+(\Delta\omega+\eta\omega_m)^2 T_2^2 + \tau^2 H_1^2 J_n^2(\beta) T_1 T_2]} \quad (18)$$

where $\chi'$ represents the dispersion mode and $\chi''$ the absorption mode. Now in the case of observing the absorption mode only, Equation 18 is expressed as follows since $\Delta\omega + \eta\omega_m$ equals zero when maximum resonance conditions are satisfied.

$$\chi'' = \frac{\tau M_0 T_2 J_n(\beta) J_{n-1}(\beta)}{2[1+\tau^2 H_1^2 T_1 T_2 J_n^2(\beta)]} \quad (19)$$

Formula 19 is compared with Formula 20 which shows the absorption mode and which is the solution obtained from Bloch's simultaneous Equations 1, 2 and 3, when no modulation is applied.

$$\chi' = \frac{\tau M_0 T_2}{2[1+\tau^2 H_1^2 T_1 T_2]} \quad (20)$$

We note that the saturation factor when the polarizing field is not modulated is as follows:

$$Z = 1 + \tau^2 H_1^2 T_1 T_2 \quad (21)$$

and when modulated as follows:

$$Z' = 1 + \tau^2 H_1^2 T_1 T_2^2 J_n^2(\beta) \quad (22)$$

Accordingly, the optimum condition at which the absorption mode becomes maximum, with respect to the $n^{th}$ side band signal is given by the following equation $$\tau^2 H_1^2 J_n^2(\beta) T_1 T_2 = 1$$

In the above equation, $H_1$ which gives the optimum condition to the first side band signal is given by $$1/\tau J_1(\beta)(T_1 T_2)^{1/2}$$

which when applied to Equation 19, ensures maximum signal intensity as follows:

$$\chi_{max\ (n=1)}'' = \frac{\tau M_0 T_2 J_1(\beta)}{4} \quad (23)$$

On the other hand, if the said $H_1$ is applied to the main band signal ($n=1$) of Equation 19, under the relationship $$Z' = 1 + \tau^2 H_1^2 T_1 T_2 J_0^2(\beta) = 1 + J_0^2(\beta)/J_1^2(\beta) =$$
$$1000 \text{ (at } \beta = 0.02 \text{ approx.)}$$

the signal intensity is given by $$\chi_{(n=0)}'' = \frac{\tau M_0 T_2 J_0(\beta) J_1(\beta)}{2[1+J_0^2(\beta)/J_1^2(\beta)]} \doteq \frac{\tau M_0 T_2 J_0(\beta) J_1(\beta)}{2000} \quad (24)$$

Thus, the main band signal saturates and becomes about $1/500$ of the first side band signal. In this case, if the saturation factor $Z' = 2(n=1)$ and $Z' \doteq 1000(n=0)$ are reinserted into Equation 19, only the actual components of the first side band and the center band signals are given, viz., $$m_{(n=1)} = \frac{\tau H_1 M_0 T_2 J_1(\beta) J_0(\beta)[(\Delta\omega + \omega_m) T_2 \cos(\omega_1 - \omega_m)t + \sin(\omega_1 - \omega_m)t]}{2+(\omega+\omega_m)^2 T_2^2} \quad (25)$$

$$m_{(n=0)} = \frac{\tau H_1 M_0 T_2 J_0(\beta) J_1(\beta)[\Delta\omega T_2 \cos(\omega_1 - \omega_m)t + \sin(\omega_1 - \omega_m)t]}{1000+(\Delta\omega)^2 T_2^2} \quad (26)$$

Therefore, by setting the modulation index $\beta$ at less than 1 (in this case $\beta = 0.02$ approx.) and by selecting an RF magnetic field with a sufficiently large value so that only the first side band signal reaches the optimum condition, (in other words, the main band signal saturates), and further, by selecting a signal whose frequency component is $\omega_1 - \omega_m$ and by setting the parameter of the electric amplifier system so that the other components such as $\omega_1$, $\omega_1 + \omega_m$, $\omega_1 \pm , 2\omega_m$, and so on are filtered out, only one signal (given by Equation 25) can be obtained. This saturation is now shown in FIGURE 3(b).

We will now describe how to select the absorption and dispersion modes from the signal.

First of all the signal expressed by Equation 25 is mixed with the reference signal $\cos(\omega_1 t + \phi_0)$ derived from the RF oscillator, so as to obtain a beat signal which after being passed through a heterodyne detector is given by $$\frac{m'(\omega_m)}{(n=1)} = $$
$$\frac{\tau H_1 M_0 T_2 J_1(\beta) J_0(\beta)[(\Delta\omega + \omega_m) T_2 \cos(\omega_m t + \phi_0) - \sin(\omega_m t - \phi_0)] }{2[2+(\Delta\omega + \omega_m)^2 T_2^2]} \quad (27)$$

After then being phase detected by using the magnetic field modulation signal $\cos(\omega_m t + \psi)$ as a reference signal, the signal is given by $$S = \phi m'(\omega_m) \cos(\omega_m t + \psi) dt \quad (28)$$

Now by integrating for 1 cycle ($2\pi/\omega_m$), we obtain $$S = \frac{\tau H_1 M_0 T_2 J_1(\beta) J_0(\beta)}{2\omega_m[2+(\Delta\omega + \omega_m)^2 T_2^2]}$$
$$\times [(\Delta\omega + \omega_m) T_2 \cos(\phi_0 - \psi) - \sin(\phi_0 - \psi)] \quad (29)$$

Therefore, when $\phi_0 - \psi = 0°$, the dispersion mode is given as $$S' = \frac{\tau H_1 M_0 T_2^2 J_1(\beta) J_0(\beta)(\Delta\omega + \omega_m)}{2\omega_m[2+(\Delta\omega+\omega_m)^2 T_2^2]} \quad (30)$$

And when $\phi_0 - \psi = 90°$, the absorption mode is given as $$S'' = \frac{\tau H_1 M_0 T_2 J_1(\beta) J_0(\beta)}{2\omega_m[2+(\Delta\omega+\omega_m)^2 T_2^2]} \quad (31)$$

From the above the output of the phase-detector can be determined by the difference between the phase $\phi_0$ of RF reference and the phase $\psi$ of modulation frequency reference. Therefore, by making $\phi_0$ constant and selecting $\psi = \phi_0$ or $\psi = \phi_0 - 90°$ as required, the signal finally obtained can be accurately selected as either a dispersion or absorption mode. This is due to the fact that the RF reference signal is derived from the same RF oscillator which supplies the RF drive magnetic field to the sample to be analyzed, thus making it easy to maintain the phase $\phi_0$ constant. Moreover, in this method, after having set phase $\phi_0$ mode selection is carried out by the phase $\psi$ only. Furthermore, it is unnecessary to change $\phi_0$, since mode selection does not depend on bridge circuit unbalance or induction coil leakage which are utilized for mode selection in the conventional method. Thus the bridge detection circuit can be operated under perfect balance conditions. Even if unbalance is brought about by temperature variations, it can be neglected since mode selection depends almost entirely on the phase $\psi$.

Accordingly, we will now explain an embodiment in accordance with the above mentioned theory.

FIGURE 4 shows a block schematic of the present invention. The sample 2 is located in a strong unidirectional magnetic field formed by pole pieces $1_a$ and $1_b$. An RF coil 3 which is oriented so as to be perpendicular to the unidirectional magnetic field forms a close coupling relationship with the sample. An RF transmitter 4 supplies an RF driving field $H_1(\omega_1 = 2\pi \times 60$ mc. for example), to the sample via a bridge detection circuit 5. A pair of modulation coils $6_a$ and $6_b$ are arranged coaxially with respect to the unidirectional magnetic field, to which a 2 kc. modulation current is supplied by means of an audio frequency oscillator 7. This modulation frequency is larger than the half width of the resonance signal $\Delta f$, and smaller than the maximum frequency of the chemical shift. The RF driving field $H_1$ is selected so as to indicate optimum resonance conditions at the first side band ($n=1$) (this power is about 100 times larger than the power in the case of the unmodulated method).

When the unidirectional magnetic field is swept by means of sweep coil (not shown) and only when the resonance condition indicated by the equation below (which was obtained from Formula 10) are satisfied, gyromagnetic resonance occurs and the resonance signals appear at intervals of $2\pi f_m/\tau$ from the center field $H_0$. After which, resonance signals having a frequency component $$f_1 + (k-n)f_m(k = -\infty \ldots \infty)$$

are fed into the RF amplifier 8 after passing through the bridge detection circuit.

$$H = \frac{1}{\tau}(\omega_1 \pm n\omega_m)$$

Since the signals in this case satisfy the optimum conditions at the first side band $n=1$ only, the detected signal is given by Equation 25. A local oscillator 9 applies a radio frequency $f_L = f_1 + f_i$ (e.g., $f_i = 457$ kc.) to both mixers 10 and 11. Mixer 10 mixes the signal fed from the RF amplifier with the local oscillator signal, resulting in an output signal having a frequency component $$f_i + (k-1)f_m(k = -\infty \ldots \infty)$$

This signal is then fed into the intermediate frequency amplifier 12 which includes a crystal filter. The band-pass width of this filter is selected so as to be much larger than the resonance signal half width and is selected so as to be much smaller than the modulation frequency $f_m$ and the center frequency of the said band-pass width is also selected to a suitable frequency side band (for example, $k=0$ in Formula 10). In other words, $$f_i - f_m(f_i = 457 \text{ kc.}, f_m = 2 \text{ kc.})$$

is now set as the said center frequency. The band-pass width of the filter is set at 500 c.p.s. at each side of the said center frequency. In such cases, the band width of the resonance signal which may be carried by frequency $f_m$ component is fully covered in the said pass width, and the center band signal such as $f_i$ and other side band frequency such as $f_i + f_m$ which are undesirable are completely eliminated from the band-pass region. In other words, all frequency components with the exception of the $f_i - f_m$ component are filtered out. When this signal is mixed with the output $f_i$ derived from the mixer 11 at the mixer 13 stage, then an output signal having only one component $f_m$ is selected from the said mixer 13, which is then fed into a phase detector 15, via audio amplifier 14. At the same time, the audio frequency oscillator 7 supplies a reference signal to the phase detector 15 via phase shifter 16.

Thus, by setting the reference signal to 0° or 90° by means of the phase shifter 16, either the dispersion mode or absorption mode can be respectively selected. As a result, the output signal is indicated by indicator 17. Thus by carrying out the above described method, the spectra of $F^{19}$ (for example) as shown in FIGURE 5 can be obtained. This signal is obtained from a sample of a derivative of pentafluorocyclobutane, and as the external standard the trifluoroacetic acid is added. It will be noted here that there is no base line fluctuation, and unnecessary spectra such as main band spectra and other side band spectra except for $n=1$ are completely eliminated.

FIGURE 6, which utilizes the same units as FIGURE 4, shows an alternative arrangement in respect of the present invention.

Here, the mixer 13 and the audio amplifier 14 which are used in FIGURE 4 are not included. In this case the output signal from the intermediate frequency amplifier 12 which has only one frequency component $f_i - f_m$ is fed directly into the phase detector 15 and then indicated by the indicator 17.

The $f_i$ output from the mixer 11 and the $f_m$ output from the audio oscillator 7 are mixed by a mixer 18 after which, the beated output $f_i \pm n f_m$ is fed into an intermediate frequency amplifier 19 including a crystal filter. In this amplifier only the component of the frequency $f_i - f_m$ is selected, which is in turn fed into the phase detector 15 through a phase shifter 16, as a reference signal.

As already explained in detail, the present invention provides a means whereby only one side band signal is obtained even through the unidirectional magnetic field may be swept wider than the width of modulation frequency $2\pi f_m$. Consequently, it is possible to analyze samples containing nuclei such as $F^{19}$, $C^{13}$ and $P^{31}$ which exhibit large chemical shifts and protons which are adjacent to paramagnetic metals, due to the fact that signal overlapping or superimposition does not occur.

This invention may be used in either a single or crossed-coil magnetic resonance system.

While certain presently preferred embodiments of our invention have been described, it is to be understood that it may be otherwise embodied within the scope of the appended claims.

We claim:
1. The method of producing gyromagnetic resonance in a sample which comprises:
   (A) positioning the sample in a polarizing magnetic field;
   (B) subjecting the samples to a radio frequency magnetic field normal to said polarizing field;
   (C) modulating the polarizing field by an oscillator which superimposes an audio frequency field on the polarizing field, the modulation index of said modulation being less than unity;
   (D) adjusting the polarizing magnetic field to cause said sample to be in resonance with the radio frequency magnetic field;
   (E) detecting the signal from the sample when it is at resonance;
   (F) processing said sample signal to make it comparable with a signal from said oscillator by:
      (a) feeding the signal to an RF mixer,
      (b) feeding a local oscillator circuit to said mixer,
      (c) filtering the output of the RF mixer to produce a signal the frequency of which is equal to a preselected intermediate frequency plus or minus the frequency of the audio oscillator,
      (d) feeding the output signal from the filter into a second mixer, and
      (e) feeding into said second mixer a reference signal of intermediate frequency, said reference signal being a signal obtained by mixing a signal corresponding in frequency to the radio frequency magnetic field and to the output of the local oscillator to produce an output signal having a frequency equal to that of the audio oscillator; and (G) comparing the processed sample signal with the audio oscillator signal to produce a signal indicative of sample resonance.

2. The method described in claim 1 in which the output signal from the second mixer and the output signal from the oscillator are fed to a phase detector for comparison, the signal produced by the detector being proportional to the difference in phase between the input signals.

3. The method described in claim 2 in which the signal from the audio oscillator is shifted before feeding it to the phase detector.

4. The method of producing gyromagnetic resonance in a sample which comprises:
  (A) positioning the sample in a polarizing magnetic field;
  (B) subjecting the sample to a radio frequency magnetic field normal to said polarizing field;
  (C) modulating the polarizing field by an oscillator which superimposes an audio frequency field on the polarizing field, the modulation index of said modulation being less than unity;
  (D) adjusting the polarizing magnetic field to cause said sample to be in resonance with the radio frequency magnetic field;
  (E) detecting the signal from the sample when it is at resonance;
  (F) converting the sample signal and a signal from the audio oscillator to signals of the same intermediate frequency by:
    (a) feeding the sample signal to an RF mixer,
    (b) feeding a local oscillator circuit to said mixer,
    (c) filtering the output of the RF mixer to produce a signal the frequency of which is equal to a preselected intermediate frequency,
    (d) feeding into a second mixer a signal of intermediate frequency, said signal being a signal obtained by mixing a signal corresponding in frequency to the radio frequency magnetic field and the output of the local oscillator,
    (e) feeding the output of the audio oscillator to the second mixer, and
    (f) filtering the output of the second mixer to produce a reference signal having the same intermediate frequency as the filtered signal from the first mixer; and
  (G) comparing the converted signals to produce a signal indicative of sample resonance.

5. The method described in claim 4 in which the converted signals are fed to a phase detector for comparison to produce an output signal proportional to the difference in phase of the two signals.

6. The method described in claim 5 in which the signal of intermediate frequency produced by conversion of the signal from the audio oscillator is shifted in phase before being fed into the phase detector.

7. The method of producing gyromagnetic resonance in a sample which comprises:
  (A) positioning the sample in a polarizing magnetic field;
  (B) subjecting the sample to a radio frequency magnetic field produced by a first radio frequency, the direction of the field being normal to the polarizing field;
  (C) modulating the polarizing field by an oscillator which superimposes an audio frequency field on the polarizing field, the modulation index of said modulation being less than unity;
  (D) adjusting the polarizing magnetic field to cause said sample to be in resonance with the radio frequency magnetic field;
  (E) detecting the signal from the sample when it is at resonance;
  (F) mixing the detected signal with a second radio frequency signal to produce an intermediate frequency sample signal;
  (G) mixing the radio frequency signals to produce an intermediate radio frequency signal; and
  (H) detecting the difference between the two intermediate frequency signals.

8. The method described in claim 7 in which the intermediate frequency sample signal comprises an absorption mode and a dispersion mode and is compared with the oscillator signal in a phase detector and in which the phase of the oscillator signal is shifted to cancel one of the two modes.

9. The method described in claim 7 in which the strength of the radio frequency magnetic field is adjusted to substantially reduce the radio frequency component in the sample signal to leave the first side band as the predominate signal.

10. The method as described in claim 7 and including comparing the detected difference with a reference signal from the oscillator.

11. The method described in claim 7 in which the sample signal is filtered prior to detecting the difference between it and the intermediate RF signal.

12. The method described in claim 7 in which the intermediate radio frequency signal is mixed with a signal from the oscillator to produce a reference signal which is compared with the intermediate frequency sample signal.

References Cited

UNITED STATES PATENTS

| | | | |
|---|---|---|---|
| 2,996,658 | 8/1961 | Kirchner | 324—0.5 |
| 3,127,556 | 3/1964 | Gielow | 324—0.5 |
| 3,147,428 | 9/1964 | Anderson | 324—0.5 |
| 3,173,084 | 3/1965 | Anderson | 324—0.5 |

RUDOLPH V. ROLINEC, Primary Examiner

M. J. LYNCH, Assistant Examiner

UNITED STATES PATENT OFFICE
CERTIFICATE OF CORRECTION

Patent No. 3,462,676                         August 19, 1969

Makoto Takeuchi et al.

It is certified that error appears in the above identified patent and that said Letters Patent are hereby corrected as shown below:

Column 4, Table 1, first column, line 1 thereof, "1" should read -- 0 --; line 73, "k=1" should read -- k=-1 --. Column 5, line 28, the formula should appear as shown below:

$$m = \chi' 2H_1 \cos \omega_1 t + \chi'' 2H_1 \sin \omega_1 t$$

Column 6, line 2, "0,02" should read -- 0.02 --; line 5, $\frac{\cdot}{\cdot}$            should read            $\frac{\cdot}{\cdot\cdot}$ Signed and sealed this 9th day of June 1970.

(SEAL)
Attest:

EDWARD M. FLETCHER, JR.               WILLIAM E. SCHUYLER, JR.
Attesting Officer                        Commissioner of Patents